R. E. HARRIS.
HAY STACKER.
APPLICATION FILED APR. 17, 1909.
955,264.
Patented Apr. 19, 1910.
3 SHEETS—SHEET 1.
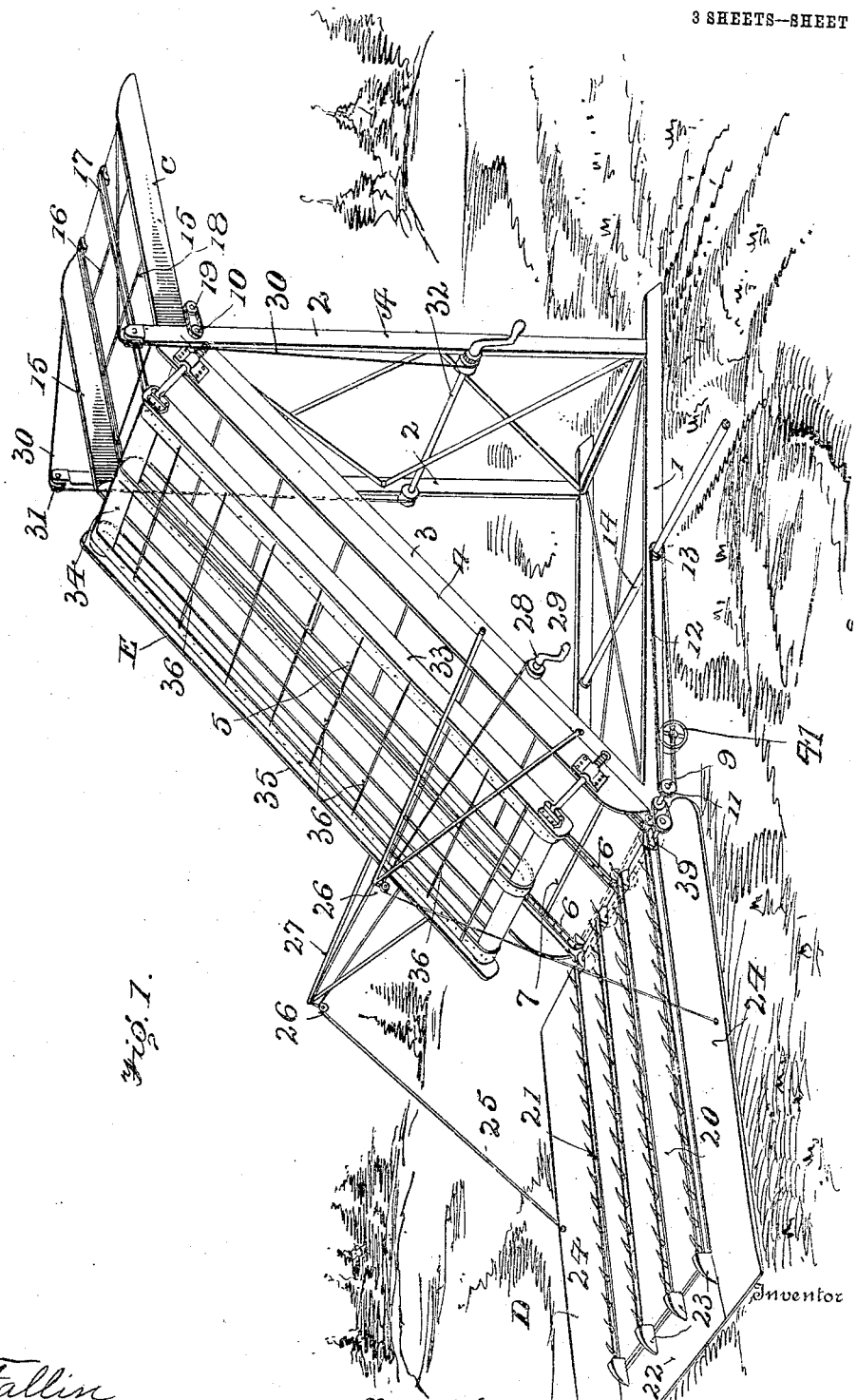

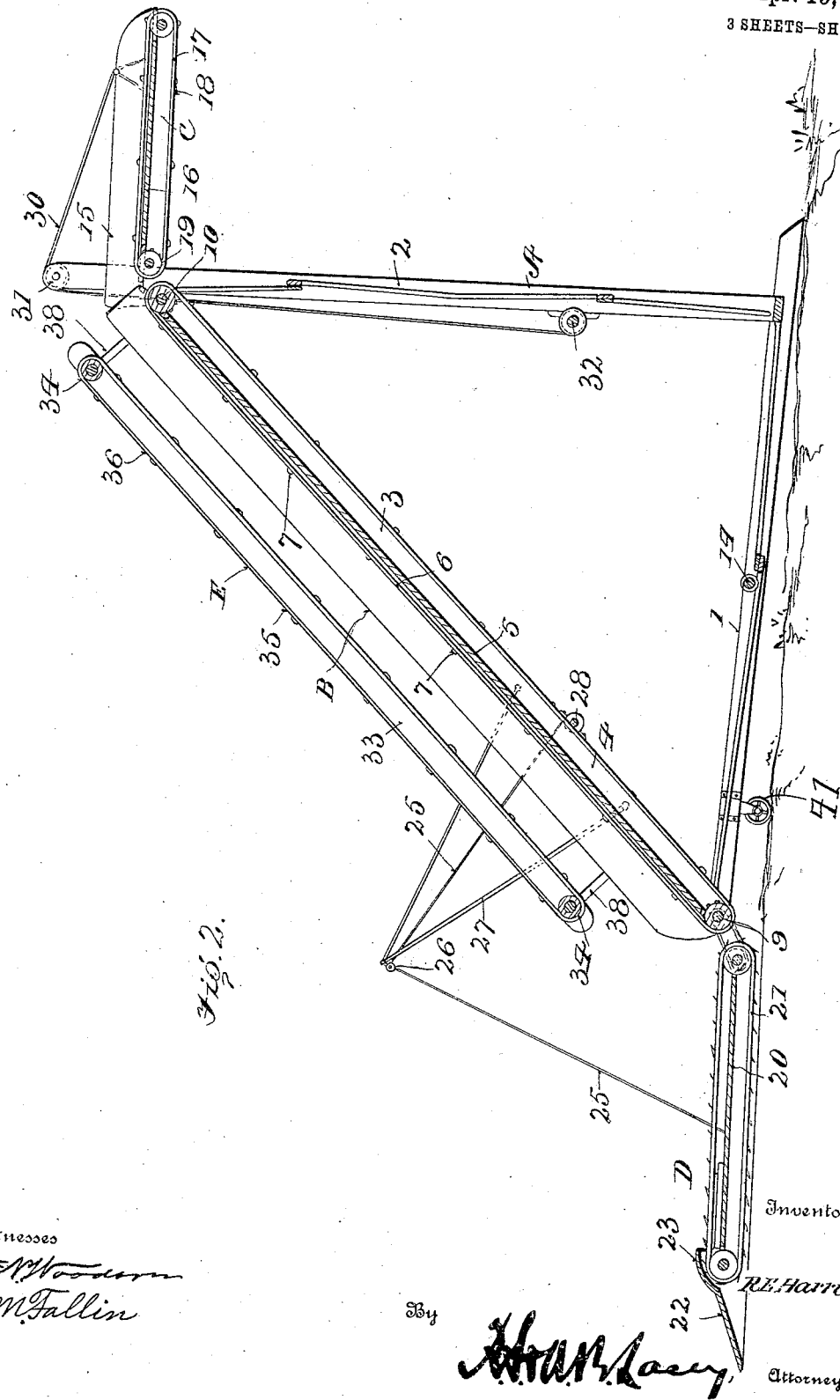

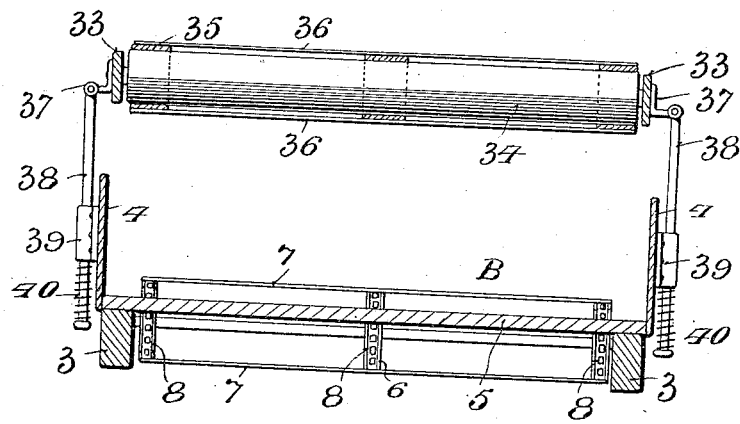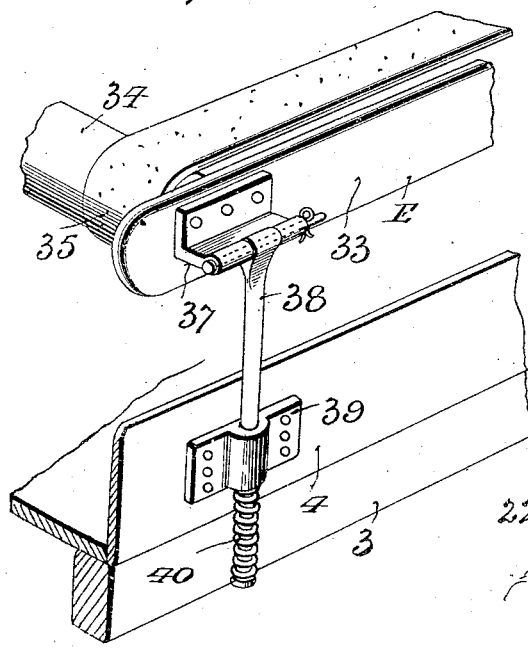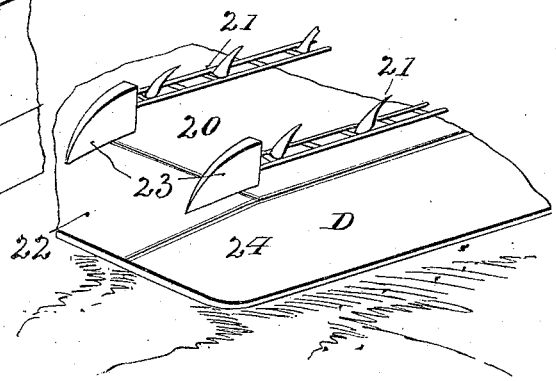

UNITED STATES PATENT OFFICE.

RICHARD ERNEST HARRIS, OF CODY, NEBRASKA.

HAY-STACKER.

955,264.

Specification of Letters Patent. Patented Apr. 19, 1910.

Application filed April 17, 1909. Serial No. 490,510.

*To all whom it may concern:*

Be it known that I, RICHARD ERNEST HARRIS, citizen of the United States, residing at Cody, in the county of Cherry and State of Nebraska, have invented certain new and useful Improvements in Hay-Stackers, of which the following is a specification.

This invention comprehends certain new and useful improvements in stackers for hay, and the invention has for its object an improved construction of apparatus of this character which may be operated by few attendants to form a stack in an expeditious manner, the apparatus being formed of comparatively few and simple parts that may be easily made and readily assembled to produce a light and strong structure which will have a maximum capacity and not be liable to the disadvantages which are incidental to hay stackers of the ordinary swing sweep type which are so liable to topple over and become thereby damaged as well as to inflict injury to the laborers and that are defective particularly in windy weather by reason of the hay, especially if it be fine, blowing from the stacker and not being properly deposited upon the stack.

The invention consists in certain constructions, arrangements and combinations of the parts that I shall hereinafter fully describe and claim.

For a full understanding of the invention reference is to be had to the following description and accompanying drawings in which:

Figure 1 is a perspective view of a hay stacker embodying the improvements of my invention; Fig. 2 is a longitudinal sectional view thereof; Fig. 3 is a transverse sectional view, the section being taken through the elevator; Fig. 4 is a perspective view of a portion of the elevator and a portion of the leveling devices arranged above the same; and, Fig. 5 is a detail perspective view of a portion of the receiving trough.

Corresponding and like parts are hereinafter referred to and designated in the accompanying drawings by the same reference characters.

The main frame work A of my improved hay stacker may be of any desired size or proportion of parts and constructed of any desired material, preferably wood, and in the present instance it embodies the slightly inclined base sills, 1, and standards or posts 2 and oblique beams 3 connected at their ends to the corresponding ends of the sills and standards, as clearly illustrated in the drawings. Any desired arrangement of braces may be employed.

The obliquely extending beams 3 of the frame A support an elevator bed B which is preferably constructed of sheet metal with side members 4 and a bottom 5. The elevator or conveyer which travels on and under the bed B, is constructed of endless chains 6, preferably three in number, although any desired number may be employed, together with any desired number of transversely extending slats 7, secured to and carried by the chains 6 and arranged at any desired intervals apart. The chains 6 work on sprocket wheels 8 that are secured to shafts 9 and 10, journaled in the frame work, the lower shaft 9 also carrying another sprocket wheel 11 driven by a chain 12 from a sprocket wheel 13 on the transversely extended driving shaft 14, the latter being journaled in suitable bearings on the base sills 1. The shaft 14 may receive its motion from any desired or convenient source of power such as a gas engine, horse power, or the like, but I have omitted any showing of such driving devices as it forms no part of my present invention.

Pivotally swung from the upper end of the frame work A to move about a substantially horizontal axis at one end, is a vertically disposed discharge conveyer C which embodies side sills 15 and a bottom 16 formed with end slots for the accommodation of the sprocket chains 17 connected at intervals to cross slats 18. The conveyer C is preferably wider than the elevator just described. The said conveyer is driven by sprocket chains and wheels 19 from the upper shaft 10 of the elevator.

In advance of the frame A and the parts which it supports, a sweep or receiving trough D is located. This trough comprises a relatively stationary bottom 20 formed with longitudinally extending slots for the conveyer chains 21, the same being driven by connection with the lower shaft 9 of the elevator. In advance of the trough D is located the preferably wedge shaped plate 22 to which the housings 23 for the front set of sprocket wheels for the chains 21 are connected.

The side sections 24 of the trough D are hinged along their inner longitudinal edges so as to swing upwardly or inwardly or to be let down substantially in the plane of the middle section of the trough. In order to adjust these side sections, cords or cables 25 are connected thereto at one end and pass upwardly over pulleys 26 carried by the upper ends of a windlass frame 27. The cables 25 are designed to swing upon the windlass shaft 28 journaled in the frame work A and operated in any desired way as by the crank handle 29.

After a sufficient quantity of the hay to be stacked is deposited upon the trough D, the side sections 24 are swung upwardly and inwardly so that the entire load will be forced to the middle and caught by the spurs of the chains 21, so as to be carried rearwardly to the elevator B. The simultaneous movement of the chains 6 and slats 7 will carry the hay upwardly and it will be finally passed to the discharge conveyer C and deposited thereby onto the stack. As the stack increases in height, it is obvious that it will be necessary to raise the discharge conveyer and for this purpose cables 30 are secured at one end to the other end of said discharge conveyer and pass forwardly over pulleys 31 and thence downwardly to the crank actuated windlass shaft 32 journaled on the standards or posts 2. It is to be understood that in the preferred arrangement of the parts, the elevator B and discharge conveyer C work at the same rate of speed, and in order to properly effect the elevation of the hay and prevent its being blown from the elevator as it passes up the same, I have provided a leveling apparatus E. This preferably comprises relatively light side frames 33, lower and upper rollers 34, belts 35 passing around said rollers and cross slats 36 secured to said belts. In order to provide for a yielding mounting for the leveling devices, I secure brackets 37 to the side frames 33, said brackets being angular as shown and having a pivotal connection with the rods 38. These rods 38 are substantially vertically disposed and work through bearings 39 secured to the bed of the elevator B. Tension springs 40 encircle the rods 38 and exert a downward tension upon said rods so as to hold the leveling devices in proper contact with the hay as it passes up the elevator and to permit the leveling device to yield and accommodate itself for loads of different quantities.

From the foregoing description in connection with the accompanying drawings, the operation of my improved hay stacker will be obvious. After the hay has been deposited upon the receiving pan D, as before described, it is then drawn into the middle thereof and will be caught by the chains 21 and carried to the elevator, and pressed properly upon the bed of the elevator, as it is carried up the latter and finally discharged from the conveyer C onto the stack.

In order to assist in moving the stacker from one point to another in the meadow, the wheels 41 support the forward ends of the base sills 1. While this is the preferred construction, it is to be understood that any desired arrangement of ground or traveling wheels may be employed in connection with the supporting frame work A, and that various other changes may be made in the construction, arrangement, and proportion of the parts without departing from the scope of my invention, as defined in the appended claims.

If a horse-power be used to operate the stacker, it is obvious that the stacker and power may always remain in proper relative position while in the meadow and that they may be so arranged that they may be moved on the meadow from one point to another while coupled together, thereby avoiding any loss of time in stacking which would arise should it be necessary to connect the power and stacker after the latter had been moved.

As best seen in Fig. 2, there are extensions at the rear of the housings for the conveyer chains 21 of the receiving trough or pan D, to protect the chains from being struck by the buck teeth while driving on the stacker with hay. These extensions are for the purpose of throwing the buck teeth away from the chains and can be made either solid with the housings or separate therefrom.

Having thus described the invention, what is claimed as new is:

1. A hay stacker comprising a supporting framework, an elevator mounted thereon, a leveling device located above the elevator, and supports for said leveling device, said supports embodying blocks secured to the elevator, and spring held rods movable in said blocks and pivotally connected to the sides of the leveling device.

2. A hay stacker embodying a supporting framework, an elevator mounted thereon, a leveling device located above the elevator and supports for said leveling device, the supports consisting of blocks secured to the sides of the elevator, spring held rods movable in said blocks and angular brackets secured to the sides of the leveling device and having a pivotal connection with the upper end of the rods.

3. A stacker comprising an elevator, a receiving trough located in front of the elevator and provided with longitudinal laterally swinging side sections adapted to be lowered into contact with the ground, cables connected to said sections, a pulley carried by said frame and over which the cables pass and a shaft carried by the elevator and extending transversely thereof, the cables winding upon the shaft whereby to raise the side sections of the trough.

4. A stacker comprising an elevator, a receiving trough located in front of the elevator, conveying mechanism for the elevator, conveying mechanism for the trough, the latter consisting of a plurality of chains having their upper stretches arranged to pass over the upper surface of the trough, front and rear sprocket wheels over which the chains pass, and a wedge shaped plate secured to the front of the trough in front of the chains and provided with the housings for the front sprocket wheels as and for the purpose set forth.

In testimony whereof I affix my signature in presence of two witnesses.

RICHARD ERNEST HARRIS. [L. S.]

Witnesses:
SAMUEL A. WINSLOW,
ROSS G. HARRIS.